Dec. 27, 1932.  M. F. ROSE  1,892,163
ORDER INDICATOR
Filed April 5, 1932
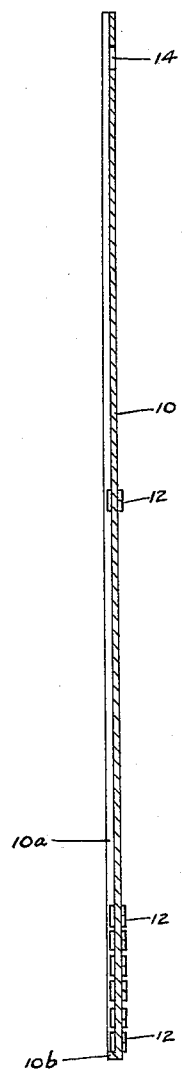
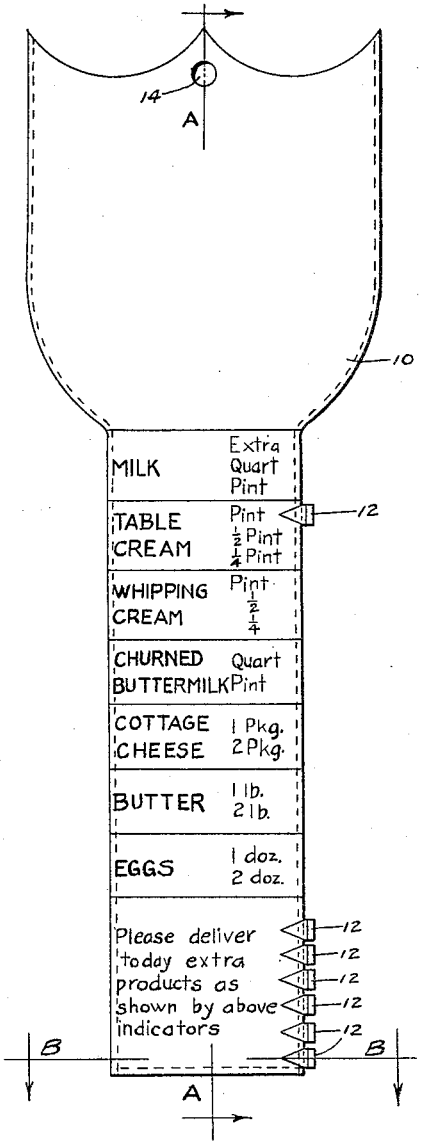
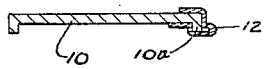
INVENTOR
MANUEL F. ROSE
BY
ATTORNEY Patented Dec. 27, 1932

1,892,163

UNITED STATES PATENT OFFICE

MANUEL F. ROSE, OF ALAMEDA, CALIFORNIA

ORDER INDICATOR

Application filed April 5, 1932. Serial No. 603,241.

This invention relates to an exceptionally simple and practical device that can be used in the home for giving information pertaining to the delivering of various types of food products.

The invention especially relates to a device that will be particularly useful in giving information pertaining to the delivering of milk products.

It is customary with many people to have the creamery deliver a certain quantity of milk directly to the home each day. The creamery that is engaged in that particular business generally handles a complete line of milk products such as sweet milk, table cream, whipping cream, churned buttermilk, cottage cheese and butter and eggs. The delivery man makes his regular deliveries each morning, but there is no way for him to ascertain any extra products that the consumer might desire. It is often necessary for the housewife to be away from home and there is no way for her to inform him of any extra products that she might want to order except for her to write a note, which is easily blown away or becomes lost and is very unsatisfactory. Furthermore, some families do not order milk products every day but only order when their supply has become exhausted, with the result that the deliverer does not know when to call for an order.

It is therefore an object of the present invention to provide a simple and inexpensive device that can be stood up in an ordinary milk bottle or hung on the door or porch of an ordinary home and which will designate to the delivery man that it is desired to order certain products in that particular home and will show at a glance the particular products and the exact quantities thereof that it is desired to order.

The invention possesses various objects and features of advantage, some of which, with the foregoing, will be made manifest in the following description of the preferred form of the invention that is illustrated in the drawing accompanying and forming part of the specification.

It is to be understood that it is not intended to limit the invention to the embodiment shown by said drawing and description, as variations may be adapted within the scope of the invention as set forth in the claim.

In the accompanying drawing:

Figure 1 is a plan view of a preferred form of device involving the invention.

Figure 2 is a central longitudinal sectional view taken on lines A—A of Figure 1, looking in direction of the arrows.

Figure 3 is an end sectional view taken on line B—B of Figure 1, looking in direction of the arrows and shows a preferred method of construction used for slidably mounting the indicators on the device.

Referring in detail to the different parts wherein like reference numerals designate like parts throughout the several views, the numeral 10 designates an oblong plate or flag that is provided to attract the attention of the delivery man. This flag is preferably made out of a suitable piece of sheet metal and is formed preferably as shown in Figure 1 with the lower portion thereof being adapted to extend into an ordinary milk bottle and the top portion being adapted to rest on the top of the bottle. The bottom and sides of the flag are bent inwardly as shown at 10a in Figures 2 and 3 to provide for strength, and also, to provide means for slidably holding a plurality of indicators 12 that are mounted on one side of the flag as shown in Figure 1. These indicators are preferably made arrow shaped and out of spring steel and are formed around the inwardly bent edge 10a of the flag as shown in Figure 2 and are adapted to have a tight resilient fit thereon so that they can be slidably moved and automatically held into different locations along said edge.

As hereinbefore stated, an object of the invention is to provide a device whereby the ordering of different products and the quantities thereof can be readily given to the delivery man without the necessity of the delivery man talking personally with the buyer. In Figure 1 there is illustrated a preferred form of plate or flag used in the invention and shows the front face thereof divided into a plurality of spaced portions, and on each spaced portion, there is affixed the name of a certain product, and also, different quantities that it might be desired to order of the product. For example, in the top space the name "Milk" is shown and also the words "Quart" and "Pint". In the next space, the name "Table cream" is shown and the words "Pint", "½ Pint" and "¼ Pint". It will be observed that one of the arrow indicators 12 has been moved to the space designating "Table cream" and has been arranged adjacent the word "Pint" indicating to the delivery man that a pint of table cream is wanted. In the other spaces the names "Whipping cream", "Churned buttermilk", "Cottage cheese", "Butter" and "Eggs" and certain quantities relative thereto are shown, and in like manner as hereinbefore mentioned, the arrow indicators 12 can be moved to any one or more of the spaces to indicate to the delivery man the particular products and quantities thereof that it is desired to order. At the bottom portion of the flag 10a space is provided to hold the indicators until it is desired to move them to the different names of products wanted. In this space the words "Please deliver today extra products as shown by above indicators" is provided. The printing may be done directly on the flag by any suitable process or a label may be provided and properly printed and the label affixed to the flag. It will be noted that the lower portion of the flag is adapted to fit into a milk bottle and that the upper portion is adapted to rest on the top of the milk bottle. A hole 14 is provided through the top portion to enable the flag to be hung in a suitable location when desired.

Although the present drawing and description relate to a device that is particularly designed to be used in connection with the ordering of milk products, it is to be definitely understood that the device may be built up in any suitable manner and used as an order indicator for ordering many other types of products without departing from the spirit of the invention. Likewise, the device may be made out of any suitable material and constructed in any suitable form and the names of the different products arranged in any suitable manner that will serve the purpose of the invention.

Having thus illustrated and described the invention, it is desired to include in this application for Letters Patent of the United States of America any and all patentable novelty that exists in the illustration and description disclosed and all that comes within the fundamental principle of the invention as set forth in the claim hereinafter mentioned.

What is claimed:

A device of the character described comprising an ablong sheet metal plate, the edges of said plate being bent at an angle with respect to the face thereof, a plurality of names representing different products provided on the face of the plate, characters designating different quantities provided on the face of the plate with said names, and a plurality of indicators slidably mounted on one of the bent edges of the plate and adapted to be individually moved to and from said names and characters substantially as set forth.

In testimony that I claim the foregoing I have hereto set my hand this 21st day of April, 1931.

MANUEL F. ROSE.